(12) United States Patent
Shimodaira

(10) Patent No.: US 8,295,645 B2
(45) Date of Patent: Oct. 23, 2012

(54) IMAGE PROCESSING APPARATUS, IMAGE PROCESSING METHOD, AND COMPUTER PROGRAM

(75) Inventor: Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 618 days.

(21) Appl. No.: 12/555,983

(22) Filed: Sep. 9, 2009

(65) Prior Publication Data

US 2010/0080484 A1   Apr. 1, 2010

(30) Foreign Application Priority Data

Sep. 29, 2008 (JP) ................................ 2008-249603

(51) Int. Cl.
G06K 9/32 (2006.01)
G06K 1/00 (2006.01)
(52) U.S. Cl. .......................... 382/298; 348/580; 358/1.2
(58) Field of Classification Search .................. None
See application file for complete search history.

(56) References Cited

U.S. PATENT DOCUMENTS

| | | | | |
|---|---|---|---|---|
| 4,602,285 A | * | 7/1986 | Beaulier et al. | 348/580 |
| 4,783,838 A | * | 11/1988 | Matsunawa | 382/271 |
| 4,803,558 A | * | 2/1989 | Hiratsuka et al. | 358/451 |
| 5,122,873 A | * | 6/1992 | Golin | 375/240.23 |
| 5,166,786 A | * | 11/1992 | Sakai et al. | 358/527 |
| 5,200,840 A | * | 4/1993 | Koike et al. | 358/526 |
| 5,351,138 A | * | 9/1994 | Sasaki et al. | 358/462 |
| 5,355,232 A | * | 10/1994 | Kataoka | 358/451 |
| 5,374,995 A | * | 12/1994 | Loveridge et al. | 358/447 |
| 5,563,962 A | * | 10/1996 | Peters et al. | 382/261 |
| 5,579,417 A | * | 11/1996 | Sakano | 382/298 |
| 5,608,824 A | * | 3/1997 | Shimizu et al. | 382/276 |
| 5,687,006 A | * | 11/1997 | Namizuka et al. | 358/462 |
| 5,760,922 A | * | 6/1998 | Kojima | 358/464 |
| 5,867,634 A | * | 2/1999 | Hirota et al. | 358/1.2 |
| 5,930,007 A | * | 7/1999 | Kojima | 358/464 |
| 6,064,494 A | * | 5/2000 | Hirota et al. | 358/1.9 |
| 6,088,062 A | * | 7/2000 | Kanou et al. | 348/441 |
| 6,157,414 A | * | 12/2000 | Sakamoto | 348/581 |
| 6,289,133 B1 | * | 9/2001 | Oshino | 382/261 |
| 6,311,328 B1 | * | 10/2001 | Miyazaki et al. | 725/37 |
| 6,389,155 B2 | * | 5/2002 | Funayama et al. | 382/118 |
| 6,456,745 B1 | * | 9/2002 | Bruton et al. | 382/298 |
| 6,640,019 B2 | * | 10/2003 | Kosugi et al. | 382/299 |
| 6,714,692 B1 | * | 3/2004 | Kim et al. | 382/299 |
| 6,720,997 B1 | * | 4/2004 | Horie et al. | 348/218.1 |
| 6,757,442 B1 | * | 6/2004 | Avinash | 382/274 |

FOREIGN PATENT DOCUMENTS

JP    2004-527734    9/2004

* cited by examiner

Primary Examiner — Manav Seth
(74) Attorney, Agent, or Firm — Kilyk & Bowersox, P.L.L.C.

(57) ABSTRACT

An image processing apparatus capable of executing filter processing with a desired blurring degree selected in accordance with an application from a multi-valued image captured an object surface, the image processing apparatus comprises: a first filter processing device for executing smoothing processing on the multi-valued image, a second filter processing device for creating a reduced image reduced from the multi-valued image with an image reduction ratio, executing smoothing processing on the reduced image, and creating an enlarged image of the smoothed image enlarged with an image enlargement ratio corresponding to the image reduction ratio, and an image display device for displaying a processed image by the first filter processing device or the second filter processing device.

9 Claims, 16 Drawing Sheets

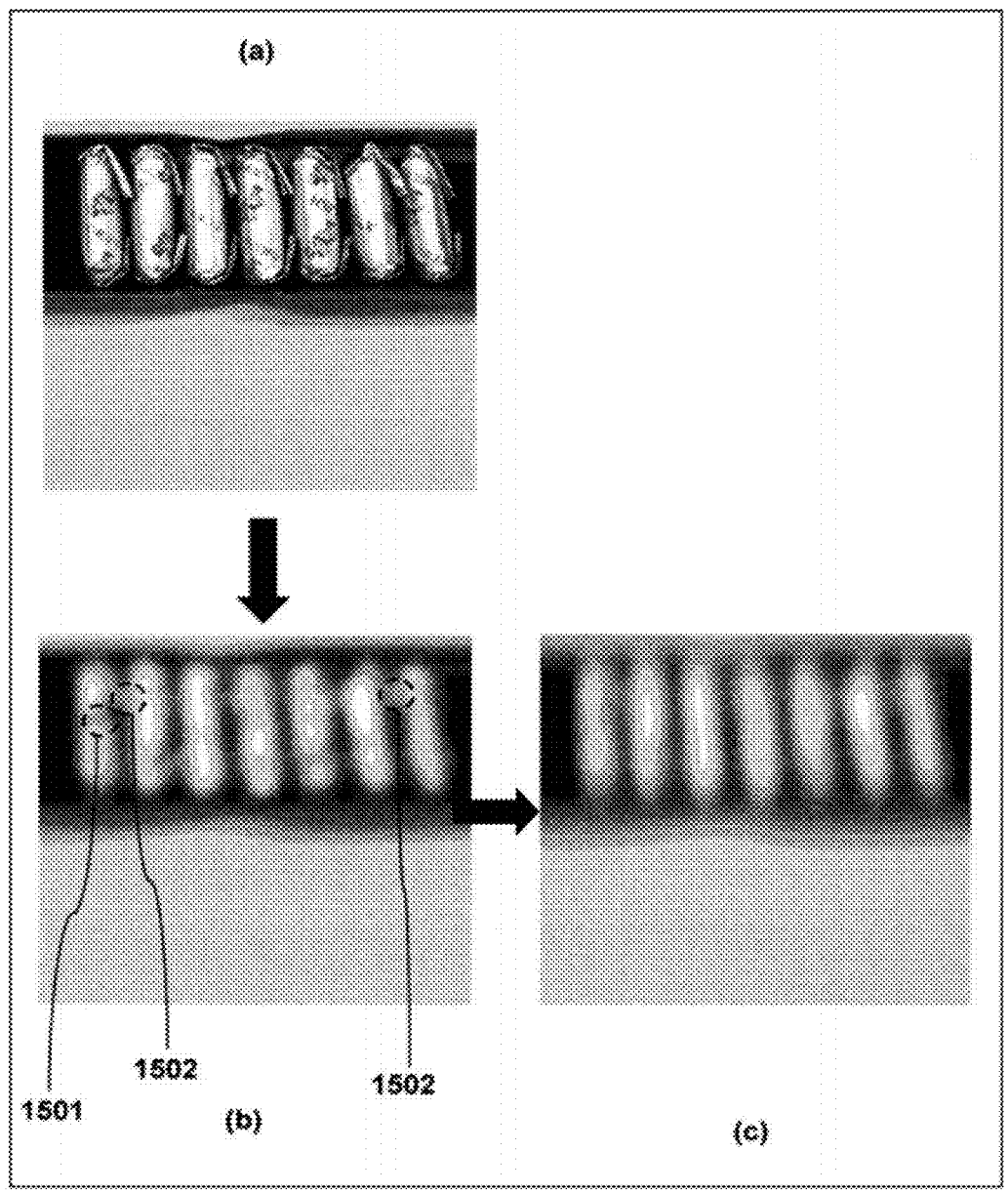

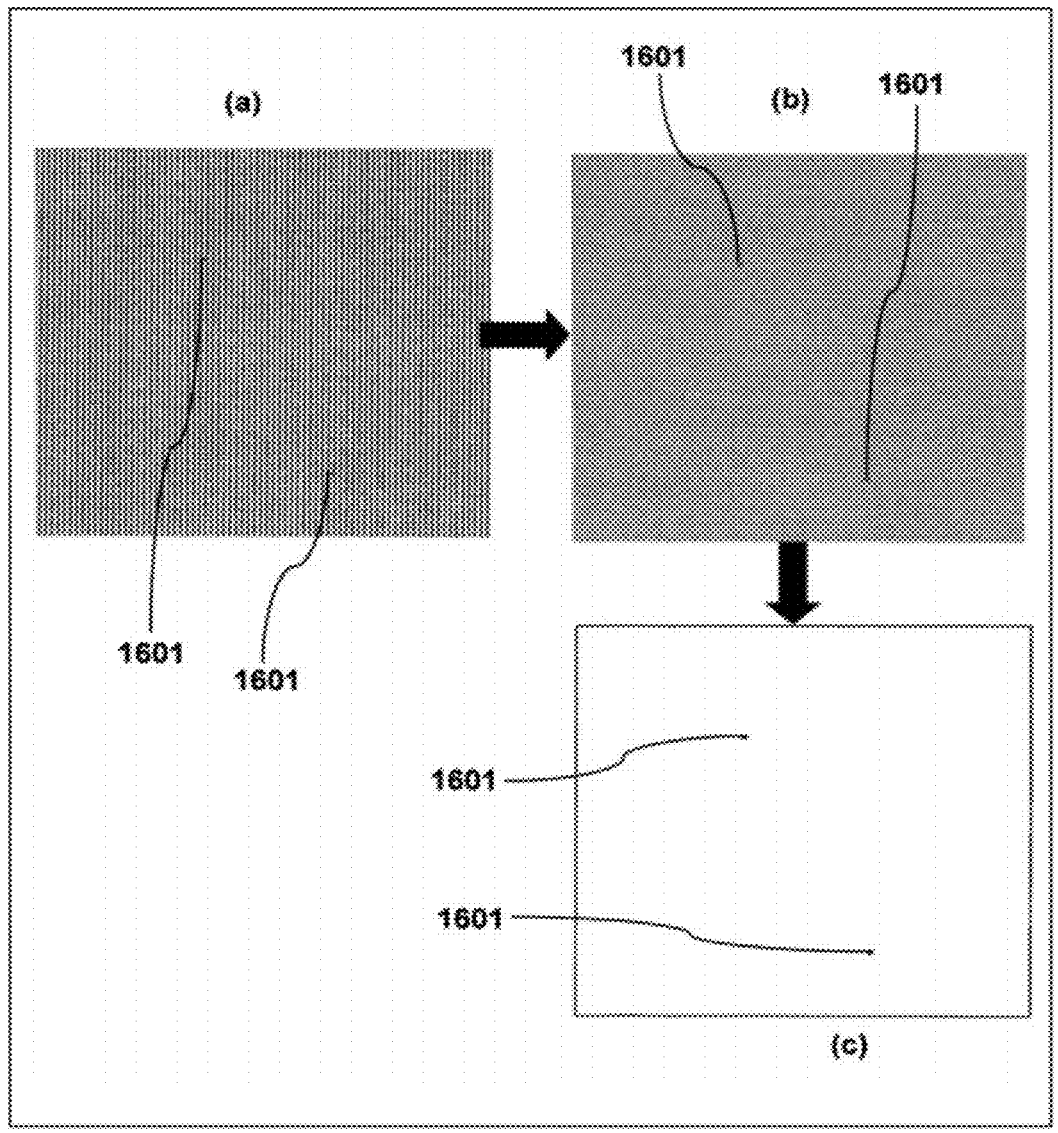

IMAGE PROCESSING APPARATUS, IMAGE PROCESSING METHOD, AND COMPUTER PROGRAM

CROSS-REFERENCE TO RELATED APPLICATIONS

The present application claims foreign priority based on Japanese Patent Application No. 2008-249603, filed Sep. 29, 2008, the contents of which is incorporated herein by reference.

BACKGROUND OF THE INVENTION

1. Field of the Invention

The present invention relates to an image processing apparatus for enhancing a specific image feature(s) in accordance with an application or allowing blobization (clustering pixels into blobs) from a multi-valued image acquired by capturing an object surface, an image processing method used in the image processing apparatus, and a computer program for causing a computer execute processing in the image processing method.

2. Description of the Related Art

Conventionally, there have been developed a large number of techniques for executing filter processing on a captured image to reduce noise present in the image, enhance a predetermined edge portion, or the like, so as to accurately extract a target object from the image. There has also been developed a technique for extracting a target object more accurately, by enhancing only a predetermined contrast in an image.

For example, Japanese Unexamined Patent Publication No. 2004-527734 discloses a method for automatically inspecting a continuously moving web, in which a blob list is created from an imaged digital data stream and blobs included in the created blob list are analyzed and compared with a sample image, to accurately identify a defect on the image.

However, in the image processing method used in the inspecting method, which is disclosed in Japanese Unexamined Patent Publication No. 2004-527734, although a certain effect is taken for improvement in accuracy to identify a defect, the degree of the filter processing cannot be varied in accordance with a user's intention. For example, when the user executes filter processing performable at higher speed in a broader range, it is not possible to resolve difficulties in using the filter processing in such a case where a blurring degree is larger than that of the filtering processing of which the user is desired, thus necessitating re-execution of the filter processing from the beginning, or adversely an image is hard to blur to a desired degree.

In order to expand applications of the image after the processing, it is more preferable from the view point of the usability to allow the user to adjust, while checking, a degree of filter processing. In other words, it is more desirable that there be a range of the degree to which the image can be blurred by the filter processing.

SUMMARY OF THE INVENTION

One aspect of the present invention is to provide an image processing apparatus capable of executing filter processing with a desired blurring degree selected in accordance with an application from a multi-valued image captured an object surface, an image processing method used in the image processing apparatus, and a computer program for causing a computer execute processing in the image processing method.

According to one embodiment of the present invention, there is provided an image processing apparatus for executing image processing on a multi-valued image captured by an image pickup device, the apparatus including: a first filter processing device for executing smoothing processing on the multi-valued image; a second filter processing device having an image reducing device for creating a reduced image reduced from the multi-valued image with an image reduction ratio, a smoothing processing device for executing smoothing processing on the reduced image, and an image enlarging device for creating an enlarged image enlarged from the reduced image, subjected to the smoothing processing executed by the smoothing processing device, with an image enlargement ratio corresponding to a reciprocal of the image reduction ratio; a selection accepting device for accepting a selection of the first filter processing device or the second filter processing device; and an image display device for displaying an image where processing by the first filter processing device or the second filter processing device, selection of which having been accepted, has been executed.

According to another embodiment of the present invention, the second filter processing device includes: a blurring degree setting accepting device for accepting a setting of a blurring degree as a degree of reduction in sharpness of the multi-valued image; a blurring degree setting device for setting the accepted blurring degree; and an image reduction ratio setting device for setting an image reduction ratio in accordance with the set blurring degree, and the image reducing device is provided so as to create a reduced image that is reduced with the image reduction ratio set by the image reduction ratio setting device.

According to another embodiment of the present invention, the image processing apparatus includes a filter processing direction accepting device for accepting designation of a direction of the smoothing processing in the first filter processing device and the second filter processing device.

According to another embodiment of the present invention, the image processing apparatus includes a repetition device for repeatedly executing processing by the image reducing device, the smoothing processing device and the image enlarging device, wherein the image reduction ratio is provided so as to set the image reduction ratio smaller every time the processing by the image reducing device, the smoothing processing device and the image enlarging device is executed by the repetition device.

Further, according to another embodiment of the present invention, there is provided an image processing method, executable by an image processing apparatus for executing image processing on a multi-valued image picked up by an image pickup device, wherein a selection is accepted between processing of executing smoothing processing on the multi-valued image, and processing of creating a reduced image reduced from the multi-valued image with an image reduction ratio, executing smoothing processing on the reduced image, and creating an enlarged image enlarged from the reduced image, subjected to the smoothing processing, with an image enlargement ratio corresponding to a reciprocal of the image reduction ratio, and an image is displayed where the processing, selection of which having been accepted, has been executed.

According to another embodiment of the present invention, in the image processing method according to the fifth aspect of the present invention, a setting of a blurring degree as a degree of reduction in sharpness of the multi-valued image is accepted, the accepted blurring degree is set, an image reduction ratio in accordance with the set blurring degree is set, and a reduced image that is reduced with the set image reduction ratio is created.

According to another embodiment of the present invention, in the image processing method according to the fifth or sixth aspects of the present invention, designation of a direction of the smoothing processing is accepted.

According to another embodiment of the present invention, in the image processing method according to any one of the fifth to seventh aspects of the present invention, processing of creating a reduced image, executing smoothing processing on the reduced image, and creating an enlarged image enlarged from the reduced image, subjected to the smoothing processing, with an image enlargement ratio corresponding to a reciprocal of the image reduction ratio is repeatedly executed, and the image reduction ratio is set smaller in every execution of the processing of creating a reduced image, executing smoothing processing on the reduced image, and creating an enlarged image enlarged from the reduced image, subjected to the smoothing processing, with an image enlargement ratio corresponding to a reciprocal of the image reduction ratio.

Moreover according to another embodiment of the present invention, there is provided a computer program, executable by an image processing apparatus for executing image processing on a multi-valued image picked up by an image pickup device, wherein the program makes the image processing apparatus function as a selection accepting device for accepting a selection of whether the image processing apparatus is functioned as a first filter processing device for executing smoothing processing on the multi-valued image, or a second filter processing device having an image reducing device for creating a reduced image reduced from the multi-valued image with an image reduction ratio; a smoothing processing device for executing smoothing processing on the reduced image; and an image enlarging device for creating an enlarged image enlarged from the reduced image, subjected to the smoothing processing executed by the smoothing processing device, with an image enlargement ratio corresponding to a reciprocal of the image reduction ratio, and an image display device for displaying an image where the processing by the first filter processing device or the second filter processing device, selection of which having been accepted, has been executed.

In one aspect of the present embodiments, a selection of processing of executing smoothing processing on the multi-valued image or processing of creating a reduced image reduced from the multi-valued image with an image reduction ratio, executing smoothing processing on the reduced image, and creating an enlarged image enlarged from the reduced image, subjected to the smoothing processing, with an image enlargement ratio corresponding to a reciprocal of the image reduction ratio is accepted. Then, an image is displayed where the processing, selection of which having been accepted, has been executed. Accepting selections of two kinds of filters enables the user to optionally select the processing of blurring the multi-valued image by the smoothing processing or the blurring processing with an increased blurring degree in accordance with a degree of necessity for post-processing. It is therefore possible, for example, to previously prevent creation of a wrong blob by checking a screen displaying the image. Further, as for the arrival time that is taken until the blurring degree arrives at a fixed blurring degree, the processing of creating a reduced image, executing smoothing processing on the reduced image, and creating an enlarged image enlarged from the reduced image, subjected to the smoothing processing, with an image enlargement ratio corresponding to a reciprocal of the image reduction ratio has a shorter arrival time, which allows large reduction in time taken until the blurring degree arrives at a desired blurring degree.

In another aspect of the present embodiments, a setting of the blurring degree as a degree of reduction in sharpness of the multi-valued image is accepted, the accepted blurring degree is set, an image reduction ratio is set in accordance with the set blurring degree, and a reduced image that is reduced with the set image reduction ratio is created. It is thereby possible to set a blurring degree optimal for the post-processing while checking the screen after the processing, so as to previously prevent execution of wrong processing.

In another aspect of the present embodiments, designation of a direction of the smoothing processing is accepted, and it is thereby possible to execute filter processing in a required direction in accordance with the post-processing.

In another aspect of the present embodiments, the processing of creating a reduced image, executing smoothing processing on the reduced image, and creating an enlarged image enlarged from the reduced image, subjected to the smoothing processing, with an image enlargement ratio corresponding to a reciprocal of the image reduction ratio is repeatedly executed, and the image reduction ratio is set smaller in every repeated execution of the series of processing. It is thereby possible to minimize a particle size of the image becoming coarse after execution of the filter processing even in the case of the image reduction ratio being large, so as to create a blurred image with sustained smoothness.

According to one aspect of the present invention, accepting selections of two kinds of filters enables the user to optionally select the processing of blurring the multi-valued image by the smoothing processing or the blurring processing with an increased blurring degree in accordance with a degree of necessity for post-processing. It is therefore possible, for example, to previously prevent creation of a wrong blob by checking a screen displaying the image. Further, as for the arrival time that is taken until the blurring degree arrives at a fixed blurring degree, the processing of creating a reduced image, executing smoothing processing on the reduced image, and creating an enlarged image enlarged from the reduced image, subjected to the smoothing processing, with an image enlargement ratio corresponding to a reciprocal of the image reduction ratio has a shorter arrival time, which allows large reduction in time taken until the blurring degree arrives at a desired blurring degree.

BRIEF DESCRIPTION OF THE DRAWINGS

FIGS. 15A to 15C are illustrative views of images in the case of post-processing being processing of counting the number of packaged confectionary; and FIG. 16 is an illustrative view of defect detection processing of detecting an image defect from a multi-valued image picked up by a camera.

DETAILED DESCRIPTION OF THE PREFERRED EMBODIMENTS

Hereinafter, an image processing apparatus according to an embodiment of the present invention is described with reference to the drawings. It is to be noted that, through the referenced drawings, elements having the same or similar configurations or functions are provided with the same or similar reference numbers, and detailed descriptions thereof are not given.

Figure 1:
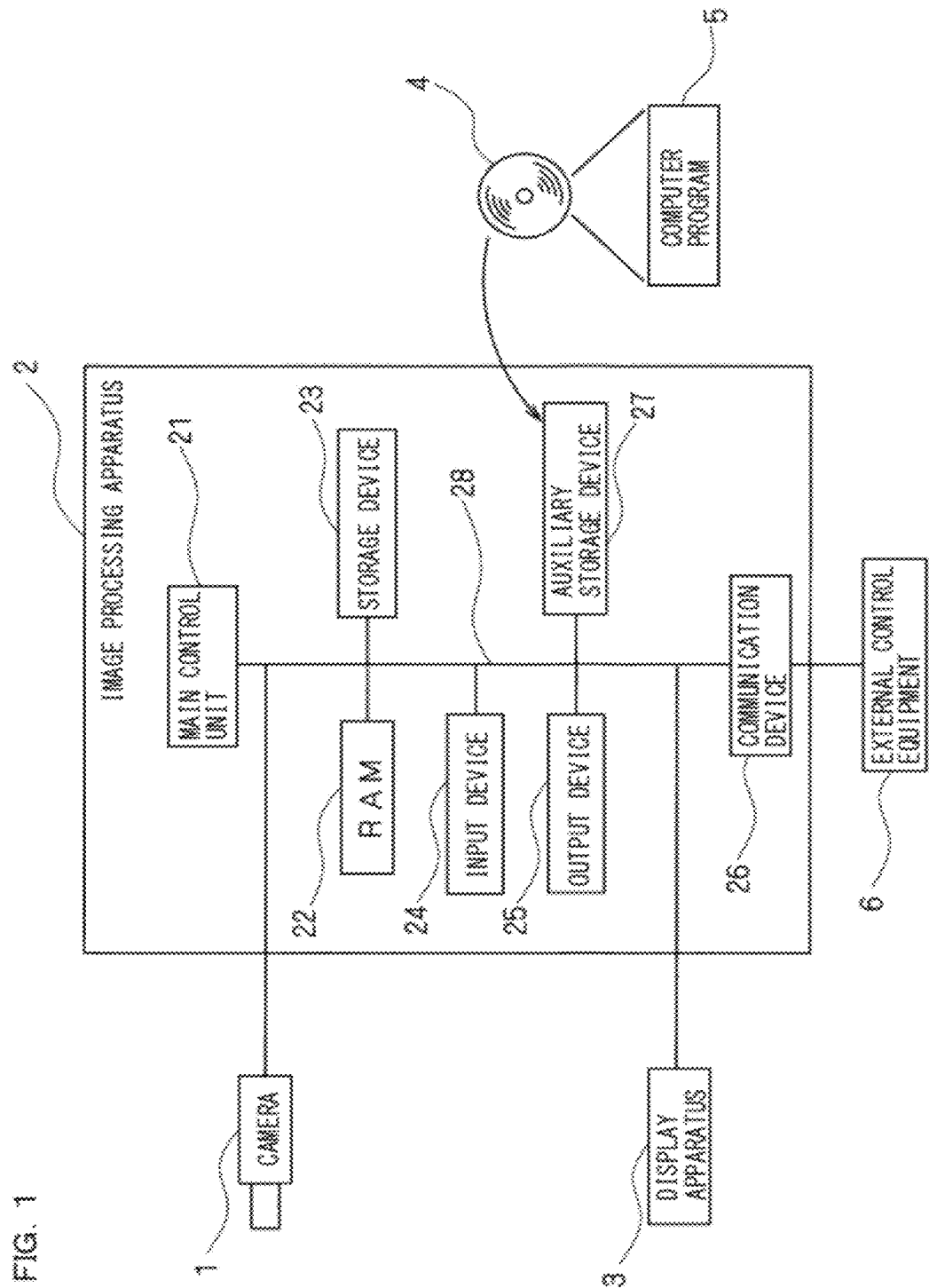
FIG. 1 is a block diagram schematically showing a configuration of an image processing apparatus according to an embodiment of the present invention.

FIG. 1 is a block diagram schematically showing a configuration of the image processing apparatus according to the embodiment of the present invention. As shown in FIG. 1, an image processing apparatus 2 according to the present embodiment is coupled with a camera 1 as an image pickup device for picking up a multi-valued image and a display device 3 as an image display device for displaying a picked up multi-valued image or a created image.

The image processing apparatus 2 is at least configured with a main control unit 21 such as CPU (central processing unit) constituted by a LSI or the like, a RAM 22, a storage device 23, an input device 24, an output device 25, a communication device 26, an auxiliary storage device 27, and an internal bus 28 that connects the above-mentioned hardware. The main control unit 21 is connected with each section of such hardware as described above of the image processing apparatus 2 through the internal bus 28. The main control unit 21 controls an operation of each section of the above-mentioned hardware, and also executes a variety of software functions in accordance with a computer program 5 stored in the storage device 23. The RAM 22 is constituted by a volatile memory such as an SRAM or SDRAM. A load module thereof is deployed at the time of executing the computer program 5, and the RAM 22 stores temporary data generated at the time of executing the computer program 5, and the like.

The storage device 23 is configured by a built-in fixed storage apparatus (hard disk, flash memory), a ROM and the like. The computer program 5 stored in the storage device 23 is downloaded by the auxiliary storage device 27 from a portable recording medium 4 such as a DVD, a CD-ROM, or a flash memory, where information such as a program and data are recorded, and developed and executed from the storage device 23 to the RAM 22 at the time of execution. Naturally, the computer program may be one downloaded from an external computer through the communication device 26.

The communication device 26 is connected to the internal bus 28, and is made capable of data transmission/reception to and from the external computer and the like by being connected to an external network such as the Internet, a LAN or a WAN. In other words, the storage device 23 is not restricted to the configuration of being built in the image processing apparatus 2, but may be an external recording medium, such as a hard disk, installed in an external server computer or the like that is connected through the communication device 26.

The input device 24 is a broad concept including an entire apparatus for acquiring/receiving input information of a touch panel or the like, integrated with a liquid crystal panel or the like, in addition to data input media such as a keyboard and a mouse. The output device 25 indicates a printing apparatus such as a laser printer or a dot printer, or the like.

The camera (image pickup device) 1 is a CCD camera provided with a CCD image pickup device, CMOS camera, or the like. The display apparatus (image display device) 3 is a display apparatus having a liquid crystal panel, and the like. The camera 1, the display apparatus 3 and the like may be integrated with the image processing apparatus 2, or separated therefrom. External control equipment 6 is control equipment connected through the communication device 26, and for example corresponds to a PLC (programmable logic controller) or the like. The external control equipment 6 means entire equipment for executing post-processing in accordance with a result of image processing by the image processing apparatus 2.

Figure 2:
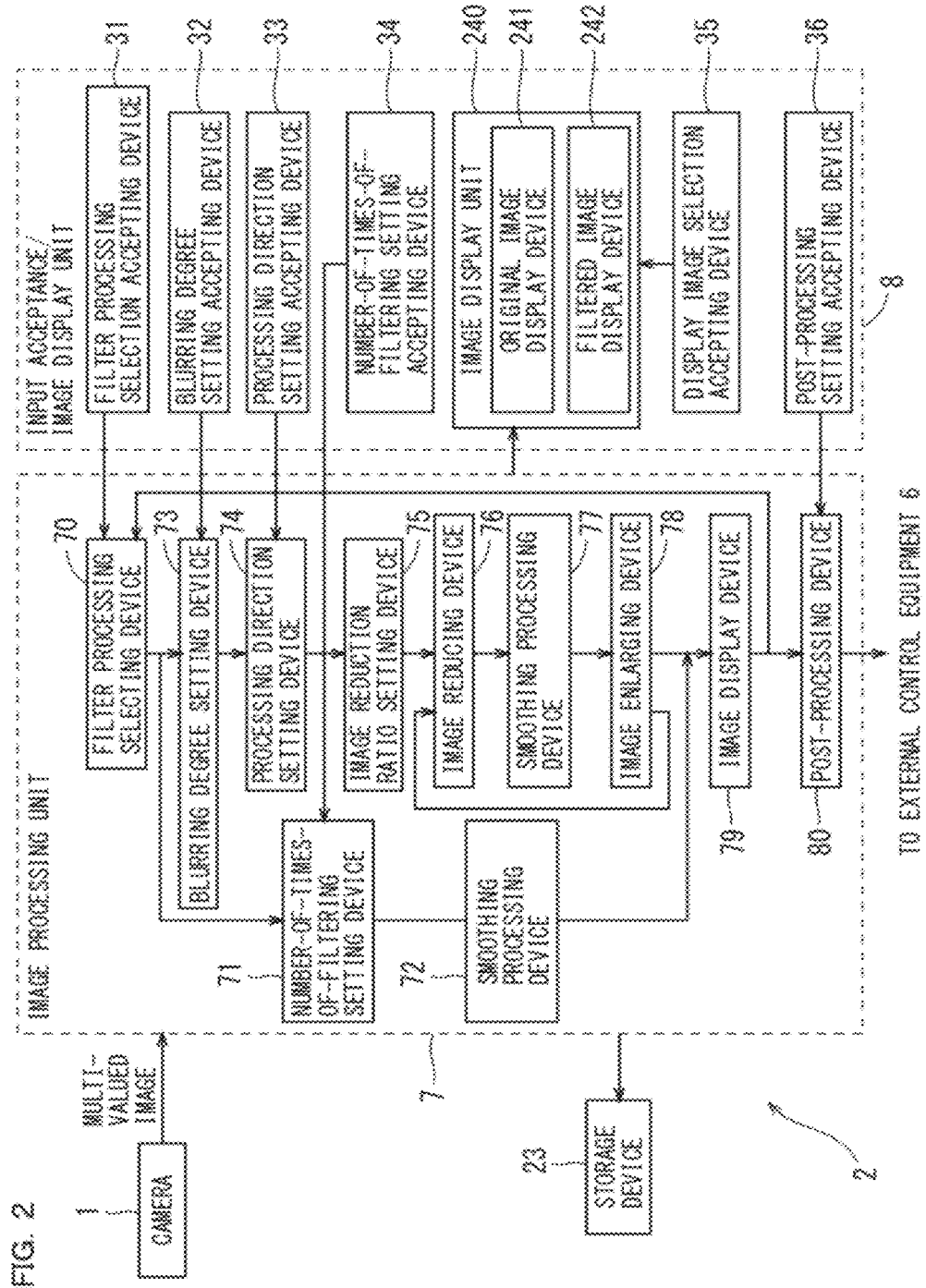
FIG. 2 is a functional block diagram showing a configurational example of the image processing apparatus according to the embodiment of the present invention.

FIG. 2 is a functional block diagram showing a configurational example of the image processing apparatus 2 according to the embodiment of the present invention. In FIG. 2, the image processing apparatus 2 according to the present embodiment is configured by the camera 1, an image processing unit 7 for executing processing of the image processing apparatus 2, the storage device 23, and an input acceptance/image display unit 8.

The camera 1 functions, for example, as a digital camera, picks up a film surface, for example, as an object to be detected, to acquire a multi-valued image, and outputs the acquired image to the image processing unit 7.

The image processing unit 7 includes a filter processing selecting device 70, a number-of-times-of-filtering setting device 71, a smoothing processing device 72, a blurring degree setting device 73, a processing direction setting device 74, an image reduction ratio setting device 75, an image reducing device 76, a smoothing processing device 77, an image enlarging device 78, an image display device 79, and a post-processing device 80. Further, the image processing unit 7 is configured by including the main control unit 21, the RAM 22, an external I/F, and the like, and controls operations of processing of the filter processing selecting device 70, the number-of-times-of-filtering setting device 71, the smoothing processing device 72, the blurring degree setting device 73, the processing direction setting device 74, the image reduction ratio setting device 75, the image reducing device 76, the smoothing processing device 77, the image enlarging device 78, the image display device 79, and the post-processing device 80.

The storage device 23 functions as an image memory, and stores as needed an original multi-valued image captured/picked up by the camera 1 and an image after execution of a variety of processing in the image processing unit 7.

The input acceptance/image display unit 8 is configured by the display apparatus 3 such as a monitor for a computer, and the input device 24 such as the mouse and the keyboard. An input accepting unit is provided on the display screen of the display apparatus 3 as a dialog box, for example, and includes a filter processing selection accepting device 31, a blurring degree setting accepting device 32, a processing direction setting accepting device 33, a number-of-times-of-filtering setting accepting device 34, a display image selection accepting device 35, and a post-processing setting accepting device 36. An image display unit 240 is provided adjacently to the input accepting unit on the display screen of the display apparatus 3, and includes an original image display device 241 and a filtered image display device 242. The user can select either the original multi-valued image or a filtered image subjected to selected filter processing in the display image selection accepting device 35, to make the selected image displayed on the display screen of the display apparatus 3.

Next, each configuration of the image processing unit 7 is described.

In the filter processing selection accepting device 31 of the input acceptance/image display unit 8, in accordance with a selection of filter processing accepted from the user, the filter processing selecting device 70 accepts a selection of whether to execute normal smoothing processing a plurality of times (hereinafter referred to as first filter processing device) or to execute smoothing processing on a reduced image so as to be enlarged to an image with an original scale (hereinafter referred to as second filter processing device).

When accepting a selection of the first filter processing device made by the filter processing selecting device 70, the number-of-times-of-filtering setting device 71 decides the number of times of smoothing processing to be executed by the smoothing processing device 72 in accordance with the number of times of filter processing accepted from the user by the number-of-times-of-filtering setting accepting device 34.

The smoothing processing device 72 functions as a two-dimensional filter typified by an averaging filter, for example, and executes smoothing processing (filter processing) on the original multi-valued image picked up by the camera 1 the number of times decided by the number-of-times-of-filtering setting device 71. The averaging filter is a two-dimensional filter that replaces a pixel value of a target pixel by an average value of all pixel values within a filter size range and outputs this value. It is to be noted that, for the smoothing processing (filter processing), another filter may be used such as a median filter being a two-dimensional filter that replaces a pixel value of a target pixel by a median value out of all pixel values within a filter size range and outputs this value.

When accepting a selection of the second filter processing device made by the filter processing selecting device 70, the blurring degree setting device 73 sets the blurring degree accepted from the user in the blurring degree setting accepting device 32 of the input acceptance/image display unit 8.

The processing direction setting device 74 sets a direction of the smoothing processing to be executed by the smoothing processing device 72 in accordance with a direction of the filter processing accepted from the user in the processing direction setting accepting device 33 of the input acceptance/image display unit 8. For example, when the lateral direction of the screen is taken as an x-axis direction, and the longitudinal direction is taken as a y-axis direction, the processing direction setting device 74 sets the x-axis direction, the y-axis direction, and the like.

The image reduction ratio setting device 75 sets in the image reducing device 76 an image reduction ratio with respect to the original multi-valued image picked up by the camera 1 in accordance with the blurring degree set by the blurring degree setting device 73. The image reduction ratio setting device 75 is configured, for example, in a form of a reference table for the image reduction ratio with the blurring degree regarded as an argument such that the larger (smaller) the blurring degree, the larger (smaller) the image reduction ratio is set.

It should be noted that the reference table is not necessarily provided, but a calculation may be made based upon a predetermined defined calculation formula. For example, with a reciprocal of an image reduction ratio regarded as a reduction degree, a degree twice as large as the blurring degree is defined as a reduction degree, and hence the image reduction ratio can be set based upon the blurring degree. Further, in order to enable fine adjustment of the image reduction ratio, there may be provided an adjustment coefficient accepting section (not shown) for accepting an input of an adjustment coefficient $\alpha$, by which an image reduction ratio obtained by referencing the reference table is multiplied.

Moreover, the image reduction ratio as mentioned herein is, for example, one in the range from one-half fold to one-fiftieth fold. Among them, the image reduction ratio being large defines, for example, that the image reduction ratio of one-fiftieth is larger than that of one-half fold. Conversely, the image reduction ratio being small means that the image reduction ratio of one-half fold is smaller than that of one-fiftieth fold.

The image reducing device 76 performs processing of using a technique referred to as area averaging, for example, and reduces the original multi-valued image with the image reduction ratio set by the image reduction ratio setting device 75, to create a reduced image. In this case, area averaging is a technique in which, for example when an original multi-valued image of 4×4 pixels is reduced into one-half to create a reduced image of 2×2 pixels, the original multi-valued image is divided into four blocks of 2×2 pixels, an average value of luminance values of four pixels constituting each block is calculated, and the average value of each block is regarded as one pixel value, to create a reduced image of 2×2 pixels.

The smoothing processing device 77 functions as a two-dimensional filter typified, for example, by the averaging filter, and executes filter processing on the reduced image created by the image reducing device 76. The smoothing processing device 77 is configured including a reference table for a filter size (or the number of times of passage through the filter) with the blurring degree (or the image reduction ratio) regarded as an argument such that the larger (smaller) the blurring degree (or the image reduction ratio), the larger (smaller) the filter size (or the number of times of passage through the filter) is set.

It should be noted that the reference table is not necessarily provided, but a calculation may be made based upon a predetermined defined calculation formula. Further, the "filter size" means the number of pixels M constituting a side of a two-dimensional filter of M×M pixels.

The image enlarging device 78 performs processing using a technique referred to as bilinear interpolation, for example, and enlarges the reduced image, subjected to the filter processing executed by the smoothing processing device 77, with an image enlargement ratio corresponding to a reciprocal of the image reduction ratio, to create an enlarged image. The enlarged image corresponds to shading contained in the original multi-valued image. In this case, bilinear interpolation is an interpolation where linear interpolation is two-dimensionally expanded, a technique where an interpolated value, weight-averaged in accordance with distances from four pixels on the periphery of one pixel to a pixel to be interpolated, is regarded as a pixel value of the pixel to be interpolated.

The image display device 79 designates the image display unit 240 of the input acceptance/image display unit 8 to display an image stored in the storage device 23. Specifically, in the display image selection accepting device 35 of the input acceptance/image display unit 8, the image display device 79 reads from the storage device 23 either the original multi-valued image or the filtered image processed by the filter processing device, to make the read image displayed by the original image display device 241 or the filtered image display device 242, in accordance with a selection of the displayed image accepted from the user. The user estimates an effect of the selected filter processing with appropriate use of the image (original image, filtered image) displayed in the image display unit 240, to re-select appropriate filter processing in accordance with a result of the estimation. For example, it is possible to re-execute filter processing on the original image stored in the storage device 23 or execute further filter processing on the filtered image, so as to efficiently obtain a desired image. For example, when it is determined as a result of the filter processing performed by the first filter processing device that a filtered image sufficient for post-processing has not been obtained or repeated filter processing is necessary until a filtered image sufficient for post-processing is obtained, it is possible to acquire an adequate filtered image by executing the second filter processing device on the original image or the filtered image, so as to seek for reduction in filter processing time.

The post-processing device 80 performs post-processing on a filtered image, processed by the first filter processing device and/or the second filter processing device, in accordance with the selection of post-processing accepted from the user in the post-processing setting accepting device 36 of the input acceptance/image display unit 8. The filtered image subjected to the post-processing is transmitted to the external control equipment 6, and an operation of external equipment or the like is controlled by the external control equipment 6.

Figure 3:
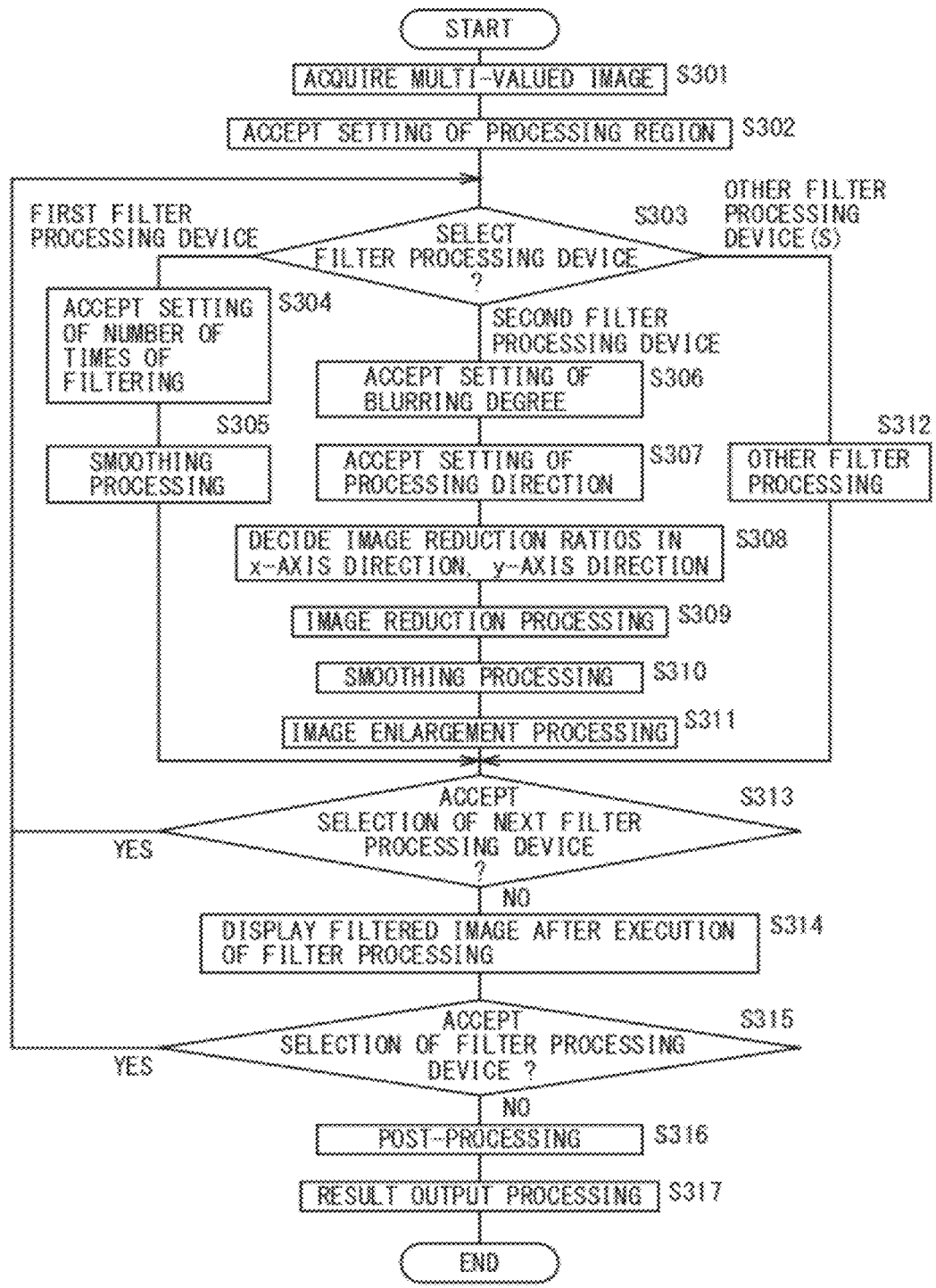
FIG. 3 is a flowchart showing a procedure for processing by a main control unit of an image processing unit of the image processing apparatus according to the embodiment of the present invention.

FIG. 3 is a flowchart showing a processing procedure by the main control unit 21 of the image processing unit 7 of the image processing apparatus 2 according to the embodiment of the present invention. Each processing procedure in the image processing method according to the embodiment of the present invention is executed in accordance with the computer program 5 according to the present invention which is stored inside the image processing unit 7.

In FIG. 3, the main control unit 21 of the image processing unit 7 acquires a multi-valued image of an object surface picked up by the camera 1 (step S301). The main control unit 21 accepts a setting of a processing region made by the user (step S302), and accepts a selection of a filter processing device with respect to the accepted processing region (step S303).

Figure 4:
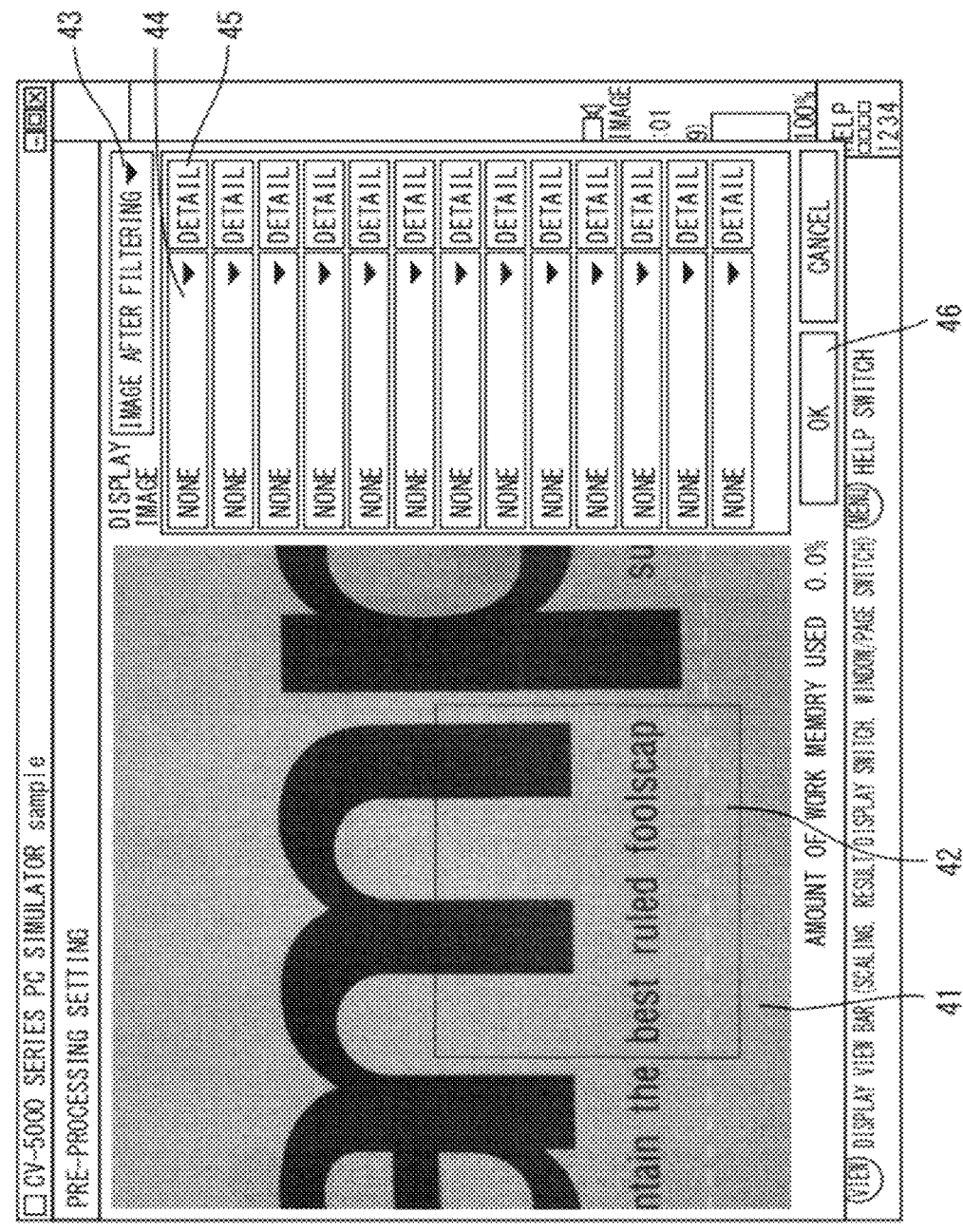
FIG. 4 is an illustrative view of a display screen in an image display unit.

FIG. 4 is an illustrative view of a display screen in the image display unit 240. The multi-valued image acquired by the camera 1 is previously stored into the storage device 23, and for example, in a display image selecting region (display image selection accepting device) 43, "Original image" is selected in the case of displaying the original multi-valued image before execution of filter processing, and "Image after filtering" is selected in the case of displaying a filtered image after execution of filter processing. When the selection of "Original image" is accepted, the original image display device 241 operates to make the original multi-valued image, stored in the storage device 23, displayed in an image display region 41. When the selection of "image after filtering" is accepted, the filtered image display device 242 operates to make a filtered image after execution of filter processing displayed in the image display region 41.

By designation of a rectangular region by the input device 24 such as the mouse, designation of the processing region 42 to be subjected to the filter processing is accepted. In other words, an object for the filter processing is the multi-valued image within the processing region 42. Therefore, the filtered image after execution of the filter processing is also displayed within the processing region 42.

Other than the above, a filtering selection region 44, a filtering condition setting button 45, a filtering processing decision button 46, and the like are provided, and a detail of each of those functions is described below.

Returning to FIG. 3, when the main control unit 21 of the image processing unit 7 determines to have accepted the selection of the first filter processing device (step S303: first filter processing device), the main control unit 21 accepts a setting of the number of times of filtering (step S304), executes only the accepted number of times of smoothing processing on the acquired multi-valued image (step S305), and advances the processing to step S313.

Figure 5:
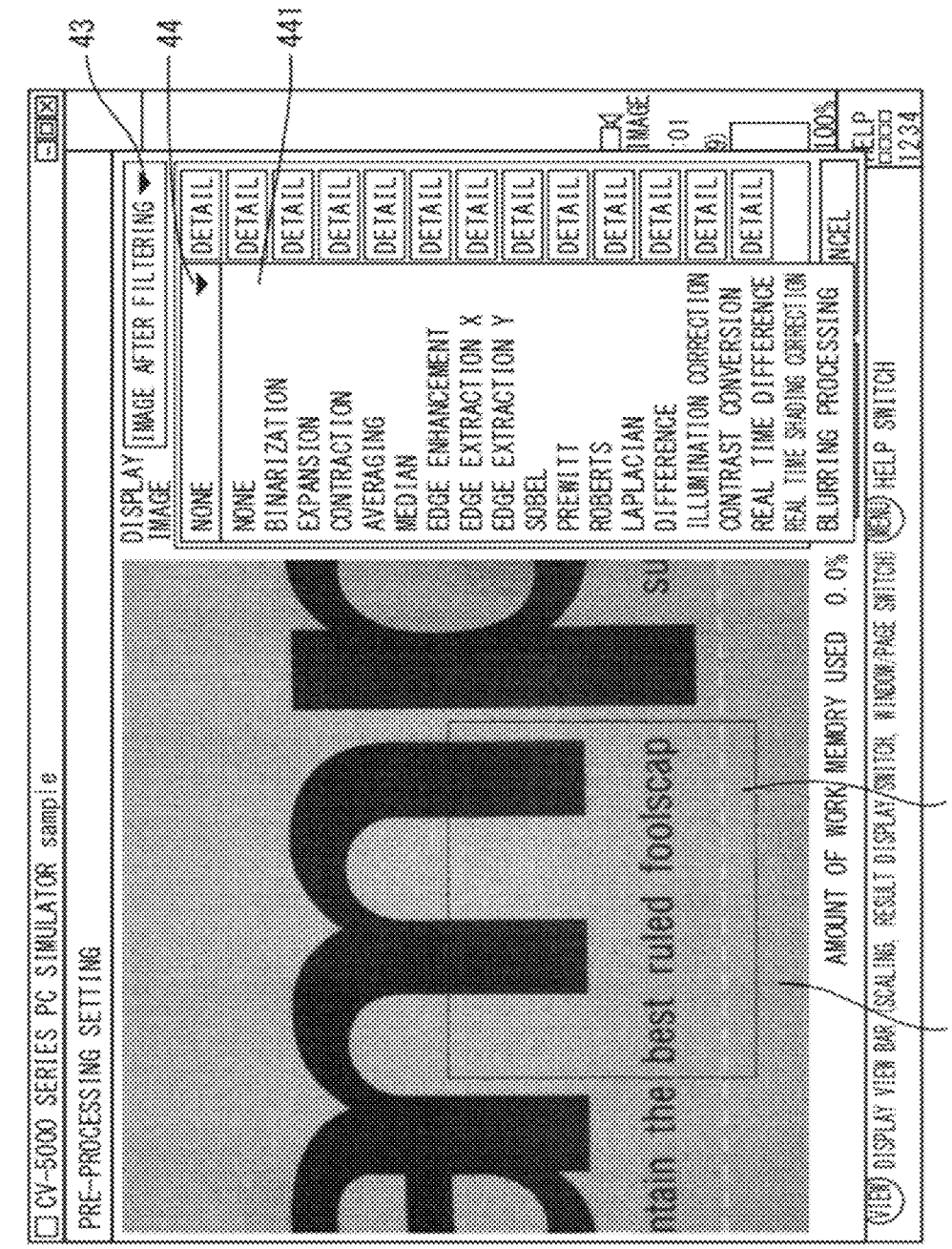
FIG. 5 is an illustrative view of the display screen in the image display unit in the case of accepting a selection input of a filter processing device.
Figure 6:
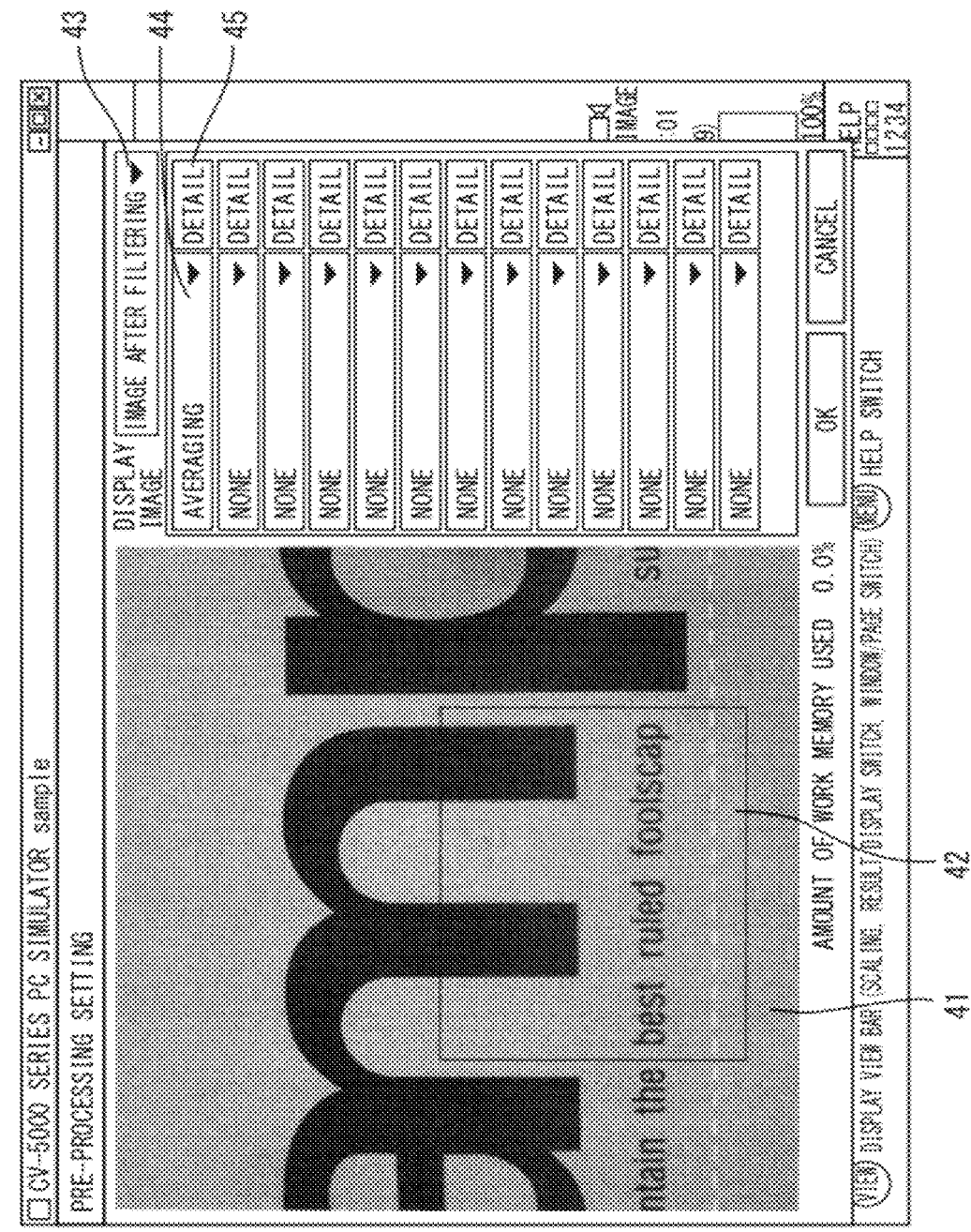
FIG. 6 is an illustrative view of the display screen in the image display unit when the selection input of a first filter processing device is accepted as the filter processing device.

FIG. 5 is an illustrative view of the display screen in the image display unit 240 in the case of accepting a selection input of the filter processing device. When the filtering selection region 44 is selected by the input device 24 such as the mouse, a pull down menu 441 displaying a list of kinds of selectable filter processing devices is displayed. FIG. 6 is an illustrative view of the display screen in the image display unit 240 when the selection input of the first filter processing device, namely "Averaging", is accepted as the filter processing device. When the selection input of "Averaging" is accepted by the input device 24 such as the mouse out of the pull down menu 441, the smoothing processing is performed based upon an initially set filtering condition. The filtered image subjected to the smoothing processing is displayed in the processing region 42 when the filtering processing decision button 46 is selected by the input device 24 such as the mouse.

Figure 7:
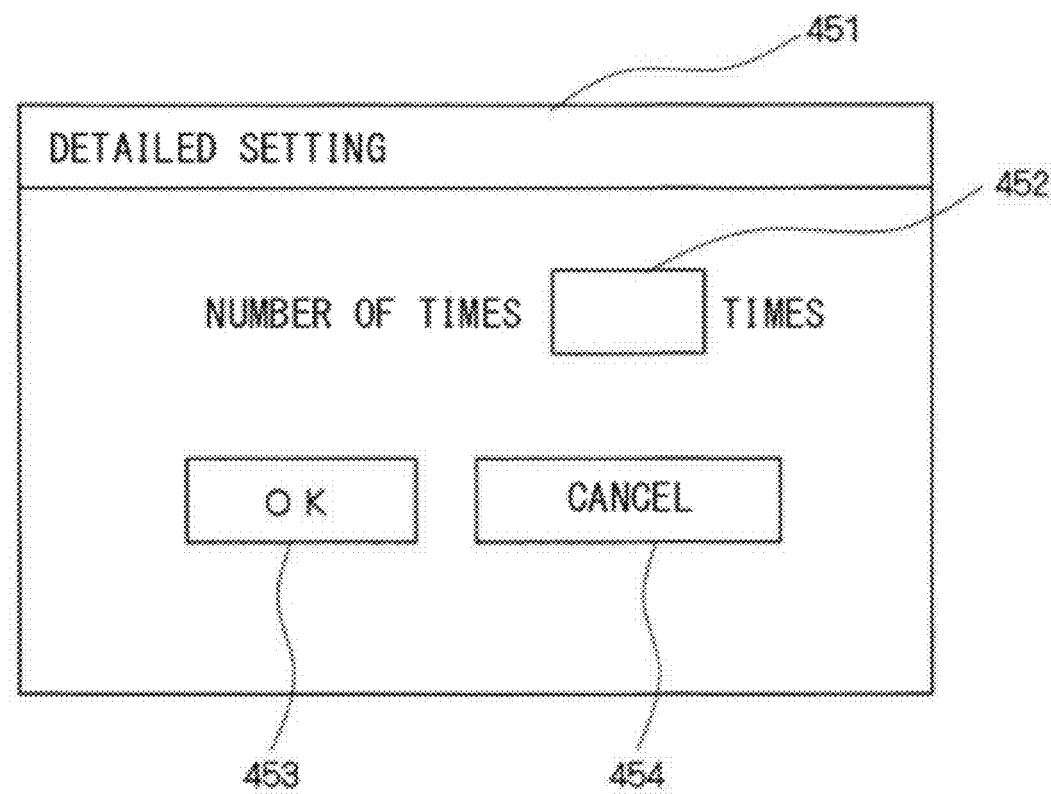
FIG. 7 is an illustrative view of a filtering condition setting screen when a selection input of "Averaging" is accepted.

It is to be noted that selecting the filtering condition setting button 45 by the input device 24 such as the mouse can set detailed information on the filtering condition. When the filtering condition setting button 45 is selected, a filtering condition setting screen is displayed in a pop-up manner. FIG. 7 is an illustrative view of a filtering condition setting screen when the selection input of "Averaging" is accepted.

A filtering condition setting screen 451 has a number-of-times-of-filtering setting region 452 for setting the number of times of filtering, and the smoothing processing is repeatedly executed only the number of times inputted in the number-of-times-of-filtering setting region 452. An "OK" button 453 is selected in the case of deciding the number of times of filtering to be the set number, and a "Cancel" button is selected in the case of making a re-setting.

Figure 8:
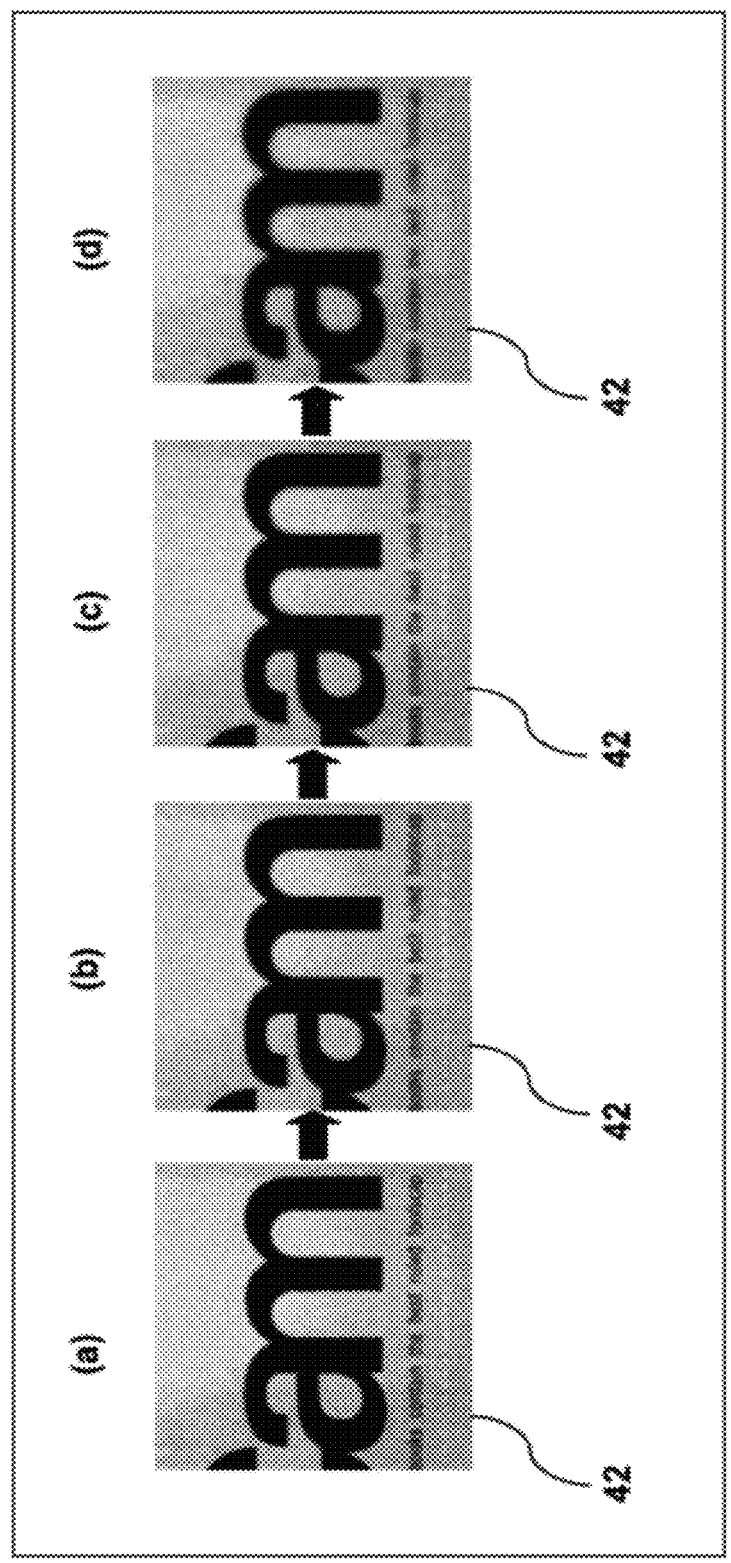
FIGS. 8A to 8D are illustrative views of filtered images each in accordance with a set number of times of filtering.

FIGS. 8A to 8D are illustrative views of filtered images each in accordance with the set number of times of filtering. FIGS. 8A to 8D show filtered images in the processing region 42. FIG. 8A shows a filtered image when the number of times of filtering is set to "1", FIG. 8B shows a filtered image when the number of times of filtering is set to "2", FIG. 8C shows a filtered image when the number of times of filtering is set to "3", and FIG. 8D shows a filtered image when the number of times of filtering is set to "9".

As seen by comparison between FIGS. 8A to 8D, it is found that the image becomes less clear and a blurring degree thereof increases with increase in number of times of filtering.

Returning to FIG. 3, when the main control unit 21 of the image processing unit 7 determines to have accepted the selection of the second filter processing device (step S303: second filter processing device), the main control unit 21 accepts a setting of the blurring degree (step S306), and accepts a setting of a direction of the filter processing (step S307).

Figure 9:
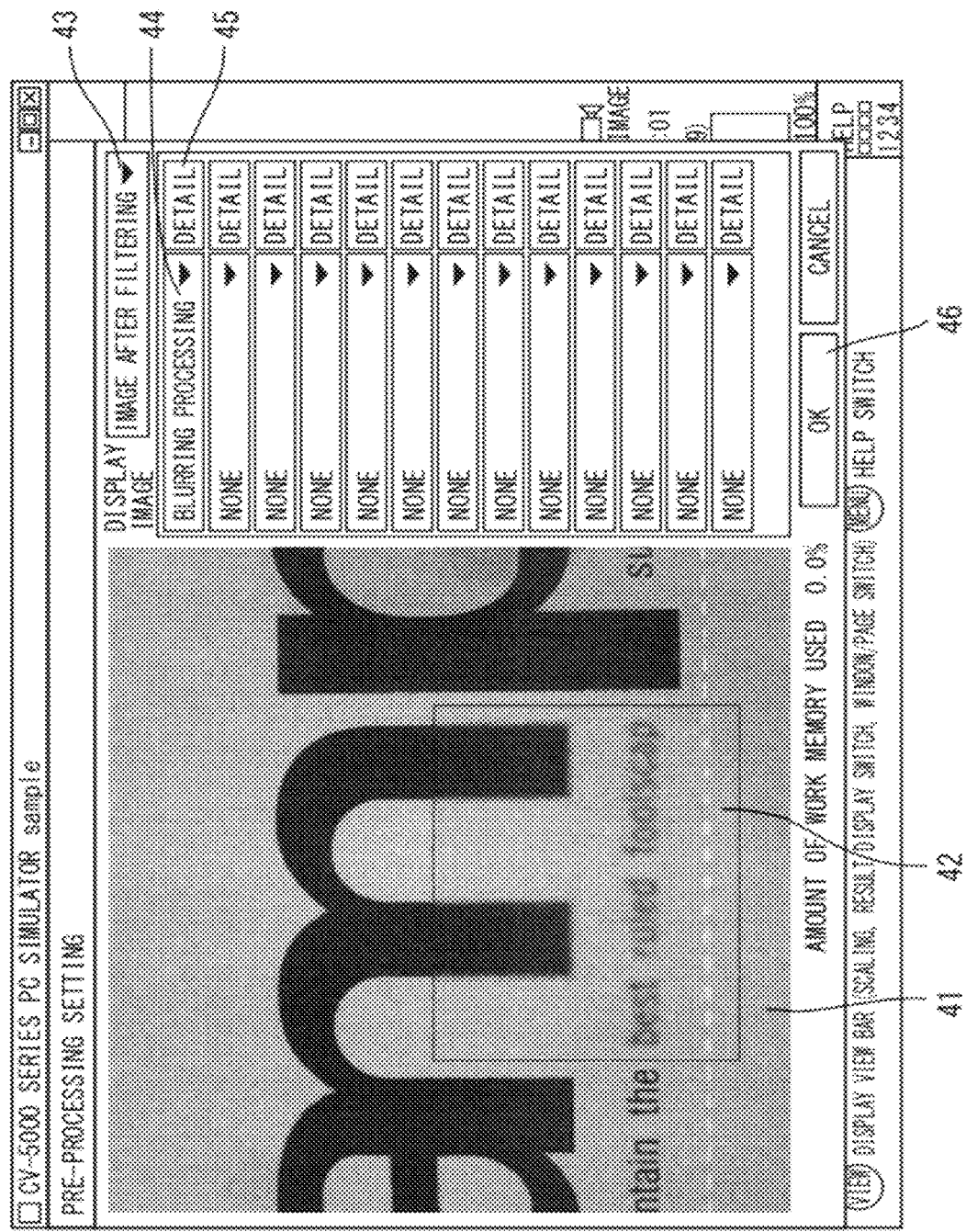
FIG. 9 is an illustrative view of the display screen in the image display unit when a selection input of a second filter processing device is accepted as the filter processing device.

FIG. 9 is an illustrative view of the display screen in the image display unit 240 when a selection input of the second filter processing device is accepted as the filter processing device. When the filtering selection region 44 is selected by the input device 24 such as the mouse, as in FIG. 5, a pull down menu 441 displaying a list of kinds of selectable filter processing devices is displayed, and the selection input of the second filter processing device, namely "Blurring processing" of reducing the image, executing smoothing processing on the reduced image and enlarging the image to the original size, is accepted as the filter processing device. When the selection input of "Blurring processing" is accepted, the smoothing processing is performed based upon an initially set filtering condition. The filtered image subjected to the smoothing processing is displayed in the processing region 42 when the filtering processing decision button 46 is selected by the input device 24 such as the mouse.

Figure 10:
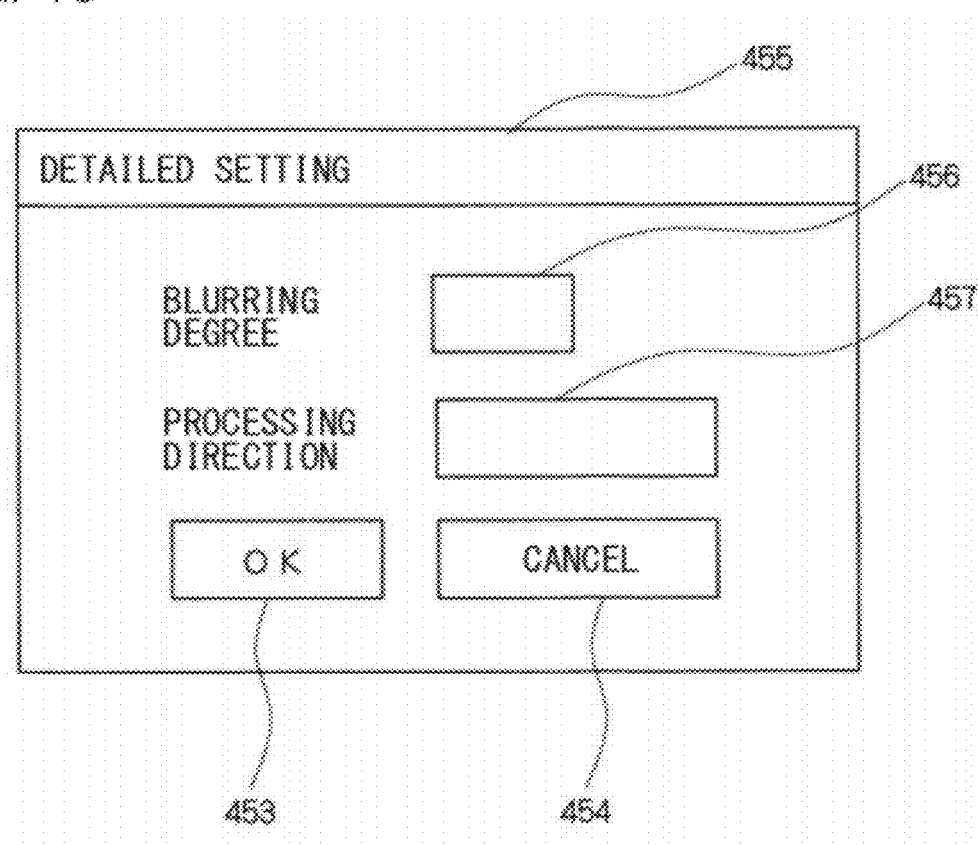
FIG. 10 is an illustrative view of the filtering condition setting screen when a selection input of "Blurring processing" is accepted.

It is to be noted that selecting the filtering condition setting button 45 by the input device 24 such as the mouse can set detailed information on the filtering condition. When the filtering condition setting button 45 is selected, the filtering condition setting screen is displayed in a pop-up manner. FIG. 10 is an illustrative view of the filtering condition setting screen when the selection input of "Blurring processing" is accepted.

In FIG. 10, a filtering condition setting screen 455 has a blurring degree setting region 456 for setting "Blurring degree" indicating a degree of blurring processing, and a processing direction setting region 457 for setting a processing direction of the blurring processing. In the blurring degree setting region 456, for example, numeric values of "1" to "10" are accepted as the blurring degree. Based upon the accepted numeric value, an image reduction ratio in the case of creating a reduced image is decided. The larger (smaller) the accepted numeric value, the larger (smaller) the image reduction ratio becomes.

In the processing direction setting region 457, an input of a direction in which the filter processing is executed is accepted. For example, when a lateral direction of the display screen is taken as an x-axis direction and a longitudinal direction as a y-axis direction, selections of three kinds of directions: the "x-axis direction"; the "y-axis direction"; and "xy-axis directions", can be accepted. The "OK" button 453 is selected in the case of deciding the blurring degree and the processing direction to be the set ones, and the "Cancel" button 454 is selected in the case of making a re-setting.

Figure 11:
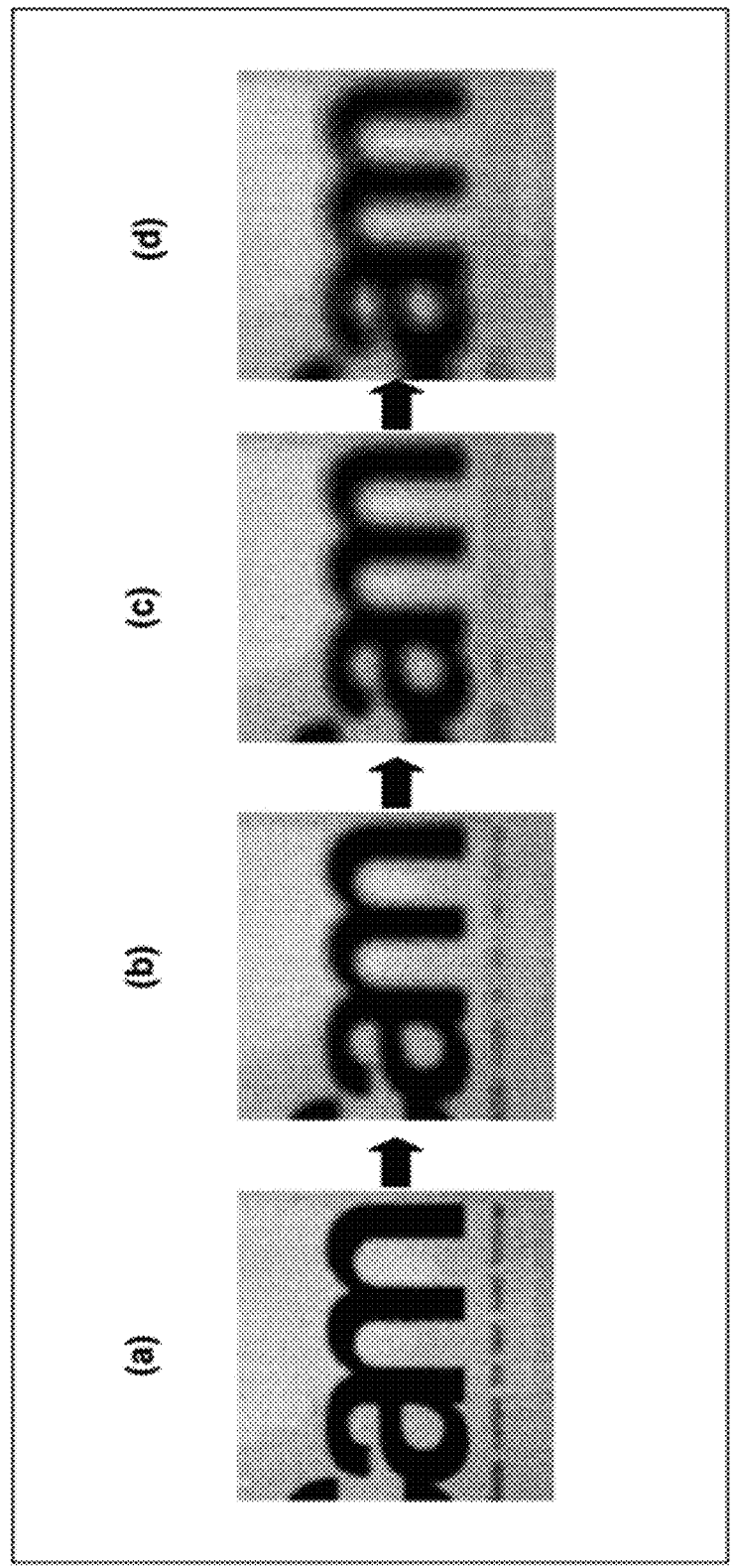
FIGS. 11A to 11D are illustrative views of filtered images each in accordance with a set blurring degree.

FIGS. 11A to 11D are illustrative views of filtered images each in accordance with a set blurring degree. FIGS. 11A to 11D show filtered images in the processing region 42. FIG. 11A shows a filtered image when the blurring degree is set to "1", FIG. 11B shows a filtered image when the blurring degree is set to "2", FIG. 11C shows a filtered image when the blurring degree is set to "3", and FIG. 11D shows a filtered image when the blurring degree is set to "4".

As seen by comparison between FIGS. 11A to 11D, it is found that the image loses its clearness more significantly with increase in blurring degree. Moreover, it is apparent that the image loses its clearness at the early stage as compared with the first filter processing device for changing the number of times of filtering. Furthermore, since repeated execution of the processing is not required, the computing processing time does not increase, or rather than that, since the image reduction ratio increases with increase in blurring degree, the computing processing time is reduced.

Figure 12:
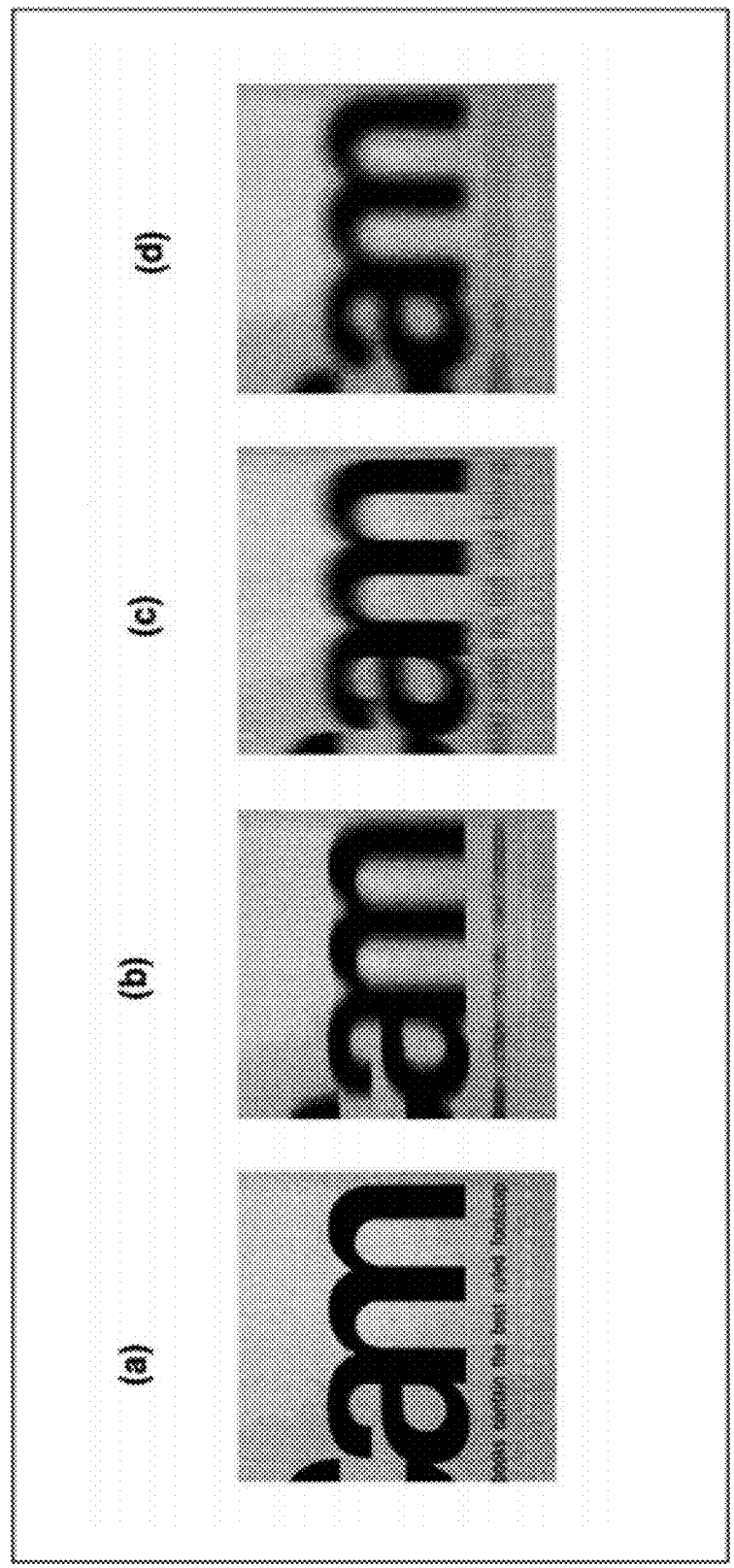
FIG. 12 are illustrative views of filtered images each in accordance with a set processing direction.

FIGS. 12A to 12D are illustrative views of filtered images each in accordance with a set processing direction. FIGS. 12A to 12D show filtered images in the processing region 42. FIG. 12A shows an original multi-valued image, FIG. 12B shows a filtered image when the processing direction is set to the "x-axis direction", FIG. 12C shows a filtered image when the processing direction is set to the "y-axis direction", and FIG. 12D shows a filtered image when the processing direction is set to the "xy-axes directions".

As seen by comparison between FIGS. 12A to 12D, a portion where the image loses its clearness changes in accordance with the direction of the filter processing. Hence it is possible to perform filter processing with consciousness of a direction in which the filter processing should be executed and a direction the filter processing should not be executed.

Returning to FIG. 3, the main control unit 21 of the image processing unit 7 decides an image reduction ratio 1/R in each processing direction, namely in the x-axis direction and/or in the y-axis direction, based upon the blurring degree and the processing direction (step S308). The main control unit 21 reduces the acquired multi-valued image with the decided image reduction ratio 1/R, to create a reduced image (step S309). The main control unit 21 executes smoothing processing on the reduced image (step S310), and enlarges the reduced image, subjected to the smoothing processing, with an image enlargement ratio R corresponding to a reciprocal of the image reduction ratio 1/R, to create an enlarged image (step S311). Creating the reduced image can significantly reduce the number of pixels as objects for the smoothing processing, and the image is enlarged to a scale as large as the scale of the original multi-valued image after execution of the smoothing processing, thus allowing reduction in computing processing time required for the blurring processing on the original multi-valued image as a whole.

When the main control unit 21 determines to have accepted a selection of a filter processing device other than the first filter processing device and the second filter processing device, such as binarization, expansion, contraction, median, edge enhancement, edge extraction, and sobel, shown in FIG. 5 (step S303: other filter processing device), the main control unit 21 executes the other filter processing, selection of which having been accepted (step S312), and advances the processing to step S313.

The main control unit 21 determines whether or not to have accepted a selection of the filter processing device to be executed next (step S313). When determining to have accepted the selection of the filter processing device to be executed next (step S313: YES), the main control unit 21 returns the processing to step S303, and repeats the above-mentioned processing. When determining not to have accepted the selection of the filter processing device to be executed next (step S313: NO), the main control unit 21 displays a filtered image after execution of the filter processing by the selected filter processing device (step S314). In other words, it is possible for the user to visually check, with the illustrative view of the display screen in the image display unit 240 shown in FIG. 4, an image after processing in the state of a series of filter processing by a plurality of currently set filter processing devices having all been executed. As described below, it is also possible to add a filter processing device sequentially after checking of the image after processing. It should be noted that the main control unit 21 executes the filter processing device, selection of which having been accepted, sequentially in a predetermined order.

The main control unit 21 determines whether or not to have accepted a selection of a new filter processing device (step S315). When determining to have accepted the new filter processing device (step S315: YES), the main control unit 21 returns the processing to step S303, and repeats the above-mentioned processing.

Accordingly, when the user determines as a result of the filter processing by the first filter processing device, for example, that a filtered image sufficient for post-processing has not been acquired or repeated filter processing is necessary until the filtered image sufficient for post-processing is acquired, the user can designate execution of the second filter processing device on the original image or the filtered image, thereby to acquire a desired image after repeated trail and error.

When determining not to have accepted the selection of the new filter processing device (step S315: NO), the main control unit 21 executes post-processing, such as detection of a portion with the pixel value being the minimal value or the maximal value (0 or 255, assuming that the pixel value is from 0 to 255) (step S316), and outputs a result after the execution (step S317).

Figure 13:
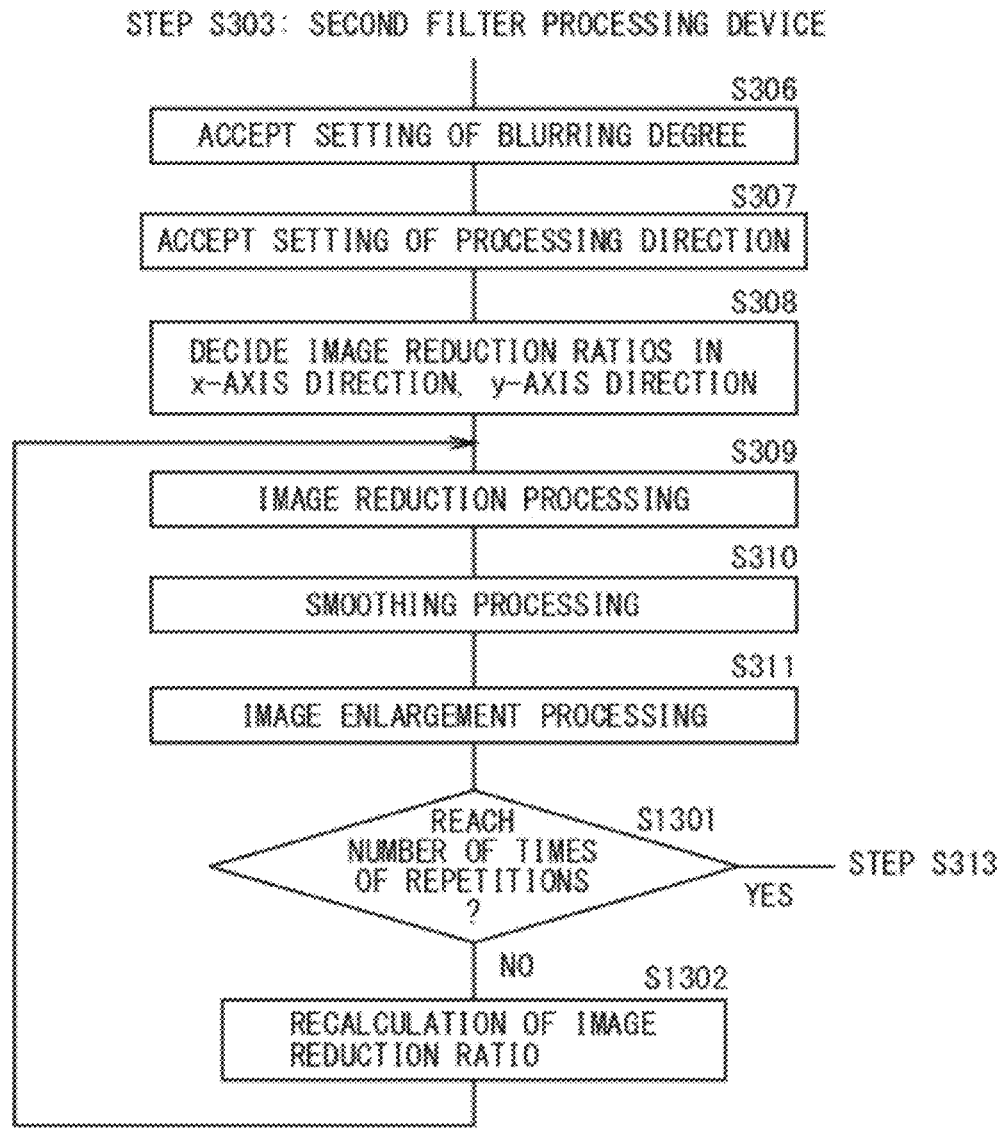
FIG. 13 is a flowchart showing a procedure for repeated processing by the main control unit on the image processing unit of the image processing apparatus according to the embodiment of the present invention.

It is to be noted that in the second filter processing device, a series of processing from the image reduction processing to the image enlargement processing may be executed a plurality of times. FIG. 13 is a flowchart showing a procedure for repeated processing by the main control unit 21 on the image processing unit 7 of the image processing apparatus 2 according to the embodiment of the present invention.

When the main control unit 21 of the image processing unit 7 determines to have accepted the selection of the second filter processing device (step S303: second filter processing device), the main control unit 21 accepts a setting of the blurring degree (step S306), and accepts a setting of the processing direction of the filter processing (step S307). Based upon the blurring degree and the processing direction, the main control unit 21 decides an image reduction ratio 1/R with respect to each processing direction, namely the x-axis direction and/or the y-axis direction (step S308), and reduces the acquired multi-valued image with the decided image reduction ratio 1/R, to create a reduced image (step S309). The main control unit 21 executes smoothing processing on the reduced image (step S310), and enlarges the reduced image, subjected to the smoothing processing, with an image enlargement ratio R corresponding to a reciprocal of the image reduction ratio 1/R, to create an enlarged image (step S311).

The main control unit 21 determines whether or not the number of times of repetitions has reached the set number of times of repetitions (step S1301). A setting input of the number of times of repetitions may be accepted, for example, by providing the number-of-times-of-repetitions setting region (not shown) in the filtering condition setting screen 455 shown in FIG. 10. Alternatively, the number of times of repetitions (e.g. twice) may be previously stored in the RAM 22 or the like, to execute processing in accordance with the stored number of times of repetitions.

When determining that the number of times of repetitions has reached the set number of times of repetitions (step S1301: YES), the main control unit 21 advances the processing to step S313, and executes the above-mentioned processing. When determining that the number of times of repetitions has not reached the set number of times of repetitions (step S1301: NO), the main control unit 21 recalculates the image reduction ratio (step S1302), returns the processing to the step S309, and repeats the above-mentioned processing.

Although the method for recalculating the image reduction ratio is not particularly restricted, the image reduction ratio preferably becomes smaller in every repeated execution of the blurring processing. This is for the purpose of smooth variations in luminance especially in an edge portion.

For example, when Rn being a reciprocal of an image reduction ratio 1/Rn in nth blurring processing is defined as an image reduction degree, an image reduction degree R(n+1) in (n+1)th blurring processing may be calculated by (Equation 1).

$$R(n+1) = \text{Roundup}(Rn/4) \qquad \text{(Equation 1)}$$

It is to be noted that in (Equation 1), "Roundup" is a function for performing round-up processing on an argument in parentheses. Therefore, for example in a case where a degree twice as large as the blurring degree is defined as the reduction ratio, when the blurring degree is set to "4", a first image reduction degree R1 is: 4×2=8. Therefore, a first image reduction ratio 1/R1 is: 1/8. Further, by (Equation 1), a second image reduction degree R2 is: 8/4=2. Therefore, a second image reduction ratio 1/R2 is 1/2.

Figure 14:
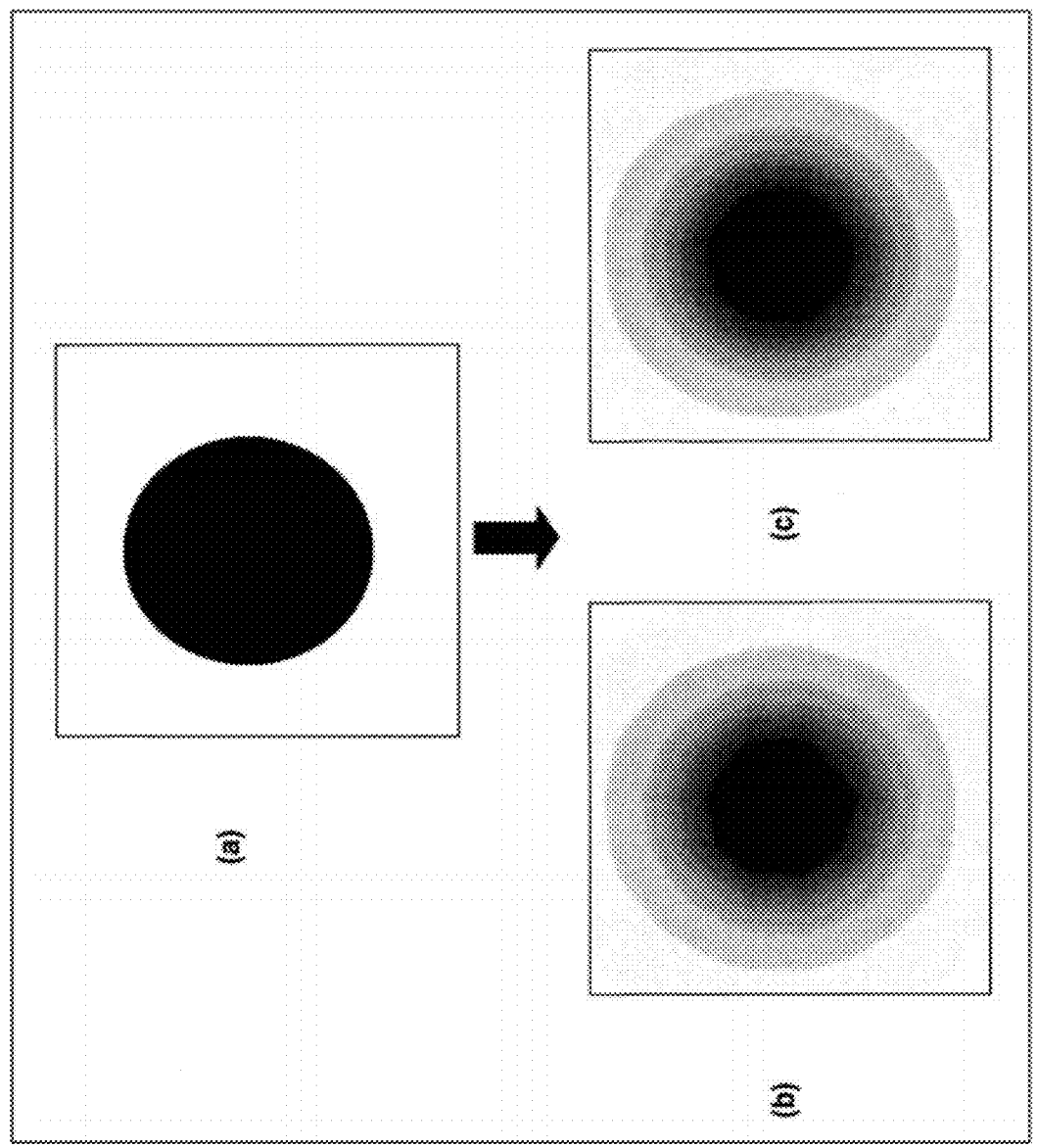
FIGS. 14A to 14C are illustrative views of filtered images when the blurring processing is executed twice.

FIGS. 14A to 14C are illustrative views of filtered images when the blurring processing is executed twice. FIG. 14A shows an original multi-valued image, FIG. 14B shows a filtered image when the blurring processing is executed once with an image reduction ratio of 1/64, and FIG. 14C shows a filtered image when the blurring processing is executed once with the image reduction ratio of 1/64 and then executed once with an image reduction ratio of 1/16.

The original multi-valued image has a circular shape as shown in FIG. 14A, whereas in FIG. 14B, the image is displayed coarsely to such a degree as to appear to have a contour in substantially polygonal shape due to the smoothing processing. As opposed to this, in FIG. 14C, the coarseness seen in FIG. 14B can be improved and a filtered image is created which is blurred sequentially from its contour portion with its substantially circular shape held. As thus described, it has been experientially confirmed that, when the second blurring processing is executed with an image reduction ratio on the order of substantially four times as large as the image reduction ratio in the first blurring processing, the coarseness of the contour is improved.

Further, it is effective to combine a plurality of filter processing in accordance with post-processing. For example, when the post-processing is processing of counting the number of packaged confectionary based upon a multi-valued image, binarizing a picked-up multi-valued image can enhance counting accuracy.

FIGS. 15A to 15C are illustrative views of images in the case of post-processing being processing of counting the number of packaged confectionary. FIG. 15A shows an original multi-valued image picked up by the camera 1, FIG. 15B shows a filtered image after performance of blurring processing by use of the second filter processing device, and FIG. 15C shows a filtered image after setting of the processing direction to the y-axis direction and performance of the blurring processing by use of the second filter processing device.

First, in FIG. 15B, the blurring processing is performed in the xy-axes directions on the multi-valued image shown in FIG. 15A, and known blob formation processing is executed, to give an image that can facilitate counting of housing of substantially seven packaged confectionary. However, such a case may occur where a blackish portion and a whitish portion are mixed depending upon package paper design. In this case, for example as a division misidentified section 1501, there might be generated a portion which is difficult to determine whether the portion should be integrated as a blob, or the portion is constituted by a plurality of blobs.

Further, such a case can also occur where, since the packages of confectionary are excessively close to each other, adjacent blobs are integrated and misidentified as one large blob. In this case, for example as contact misidentified sections 1502, even though the adjacent blobs are originally separate independent blobs, the both blobs might be connected to be misidentified as one blob.

Even in such a case, for example by performing the smoothing processing with the processing direction of the filter processing set to the y-axis direction in the example of FIG. 15B, which is a direction orthogonal to a direction having a possibility for contact and is a direction having a possibility for the blob being divided, it is possible, as shown in FIG. 15C, to clear away the contact misidentified sections 1502 that are misidentified as being in contact with each other, and also clear away the division misidentified section 1501, so as to perform counting with higher accuracy.

Further, for example when the post-processing is processing of detecting a defect on the screen, executing the above-mentioned blurring processing before binarization processing on the picked up multi-valued image can accurately detect even a defect difficult to directly detect from the original multi-valued image.

FIG. 16 is an illustrative view of defect detection processing of detecting an image defect from a multi-valued image picked up by the camera 1. FIG. 16A shows an original multi-valued image, FIG. 16B shows an image after execution of blurring processing by the second filter processing device, and FIG. 16C shows an image after execution of binarization processing.

Even in the multi-valued image as in FIG. 16A where it is difficult to detect defect sections 1601 with a grid pattern having been picked up, the grid pattern can be blurred and displayed by executing the blurring processing as shown in FIG. 16B. Executing the binarization processing on the filter image after execution of the blurring processing with an average luminance value as a reference, for example, only the defect sections 1601 can be detected as shown in FIG. 16C.

As described above, according to the present embodiment, by selecting two filter processing devices, it is possible to perform the "blurring processing" corresponding to the second filter processing device in the case of blurring an acquired multi-valued image on a large scale, and the "averaging" processing corresponding to the first filter processing device in the case of blurring the image on a small scale, and further to select the filter processing device while visually checking a filter processing performed state, so as to reliably perform desired image processing and also in a short period of time, while visually checking a blurring degree.

It is to be noted that in the illustrative view of the display screen in the image display unit 240 shown in FIG. 4, a plurality of filtering selection regions 44 and a plurality of filtering condition setting buttons 45 are displayed alongside. This is for the purpose of allowing immediate checking of the past filter processing and conditions in the case of executing the filter processing, sequentially from the top column.

For example, when the first-column filtering selection region 44 is "Blurring processing", the second-column filtering selection region 44 is "Averaging" and the third-column filtering selection region 44 is "Binarization", selecting the respective filtering condition setting buttons 45 of the filter processing on the first to third columns by the input device 24 such as the mouse can display respective filtering condition setting images. By changing the condition on the filtering condition setting screen, there is displayed in the image display region 41 a filtered image created after the condition change and at the time point when the filter processing from the first column to the third column have been executed.

Naturally, the filtered image on each column may be generation-controlled and stored into the storage device 23, and the filtered image, having been followed back to the time point of the condition change, may be displayed. For example, when the blurring degree in the second-column blurring processing is determined to be excessively large at the time point when the filter processing to the third-column processing have been executed, a filtered image, created by executing the blurring processing on a condition changed to the generation-controlled first-column filtered image, may be displayed in the image display region 41 at the time point when the condition for the second-column blurring processing has been changed. It is thereby possible to follow the processing back to an arbitrary filtered image at the time point when the user determines to have made a mistake in the condition. The generation-controlled filtered images in all generations may be stored into the storage device 23, or only filtered images of the nearest predetermined generations, e.g. only filtered images of the nearest ten generations, may be stored.

It is to be noted that the present invention is not restricted to the above embodiment, but a variety of modifications, improvements and the like are possible as long as being within the scope or spirit of the present invention. For example, in the case of repeatedly executing the second filter processing device, in place of enlarging the image to the scale of the original multi-valued image in the image enlarge processing, the image may be enlarged at once to the scale of the reduced image reduced with an image reduction ratio in the subsequent image reduction processing, to alleviate a load of the computing processing.

What is claimed is:

1. An image processing apparatus for executing image processing on a multi-valued image captured by an image pickup device, the image apparatus comprising:
   a first filter processing device for executing smoothing processing on the multi-valued image;
   a second filter processing device having
   an image reducing device for creating a reduced image reduced from the multi-valued image with an image reduction ratio,
   a smoothing processing device for executing smoothing processing on the reduced image, and
   an image enlarging device for creating an enlarged image enlarged from the reduced image after the smoothing processing, with an image enlargement ratio corresponding to the image reduction ratio;
   a selection receiving device for receiving a selection of the first filter processing device or the second filter processing device; and
   an image display device for displaying an image processed by the first filter processing device or the second filter processing device, based on the selection thereof.

2. The image processing apparatus according to claim 1, wherein
   the second filter processing device includes:
   a blurring degree setting receiving device for receiving a setting of a blurring degree as a degree of reduction in sharpness of the multi-valued image;
   a blurring degree setting device for setting the received blurring degree; and an image reduction ratio setting device for setting an image reduction ratio in accordance with the set blurring degree, wherein the image reducing device is configured to create a reduced image that is reduced with the image reduction ratio set by the image reduction ratio setting device.

3. The image processing apparatus according to claim 1, comprising a filter processing direction receiving device for receiving designation of a direction of the smoothing processing in the first filter processing device and/or the second filter processing device.

4. The image processing apparatus according to claim 1, comprising a repetition device for repeatedly executing processing by the image reducing device, the smoothing processing device and the image enlarging device, wherein the image processing apparatus is configured to set the image reduction ratio smaller at a time when the repetition device executes the processing repeatedly.

5. An image processing method, executable by an image processing apparatus for executing image processing on a multi-valued image captured by an image pickup device, the image processing method comprising:

receiving a selection between a first process to be executing smoothing processing on the multi-valued image, and a second process to be creating a reduced image reduced from the multi-valued image with an image reduction ratio, executing smoothing processing on the reduced image, and creating an enlarged image enlarged from the reduced image after the smoothing processing, with an image enlargement ratio corresponding to the image reduction ratio, and displaying an image processed by the first process or the second process based on the selection.

6. The image processing method according to claim 5, further comprising:

receiving a blurring degree as a degree of reduction in sharpness of the multi-valued image;

setting the received blurring degree;

setting an image reduction ratio in accordance with the set blurring degree; and creating a reduced image that is reduced with the set image reduction ratio.

7. The image processing method according to claim 5, wherein designation of a direction of the smoothing processing is accepted.

8. The image processing method according to claim 5, wherein processing of creating a reduced image, executing smoothing processing on the reduced image, and creating an enlarged image enlarged from the reduced image, subjected to the smoothing processing, with an image enlargement ratio corresponding to a reciprocal of the image reduction ratio is repeatedly executed, and the image reduction ratio is set smaller in every execution of the processing of creating a reduced image, executing smoothing processing on the reduced image, and creating an enlarged image enlarged from the reduced image, subjected to the smoothing processing, with an image enlargement ratio corresponding to a reciprocal of the image reduction ratio.

9. A computer program product comprising a non-transitory computer readable medium encoded with a computer program, executable by an image processing apparatus for executing image processing on a multi-valued image captured by an image pickup device, the computer program comprising:

a selection accepting code for accepting a selection of a first filter process for executing smoothing processing on the multi-valued image, or a second filter process having an image reducing process for creating a reduced image reduced from the multi-valued image with an image reduction ratio;

a smoothing process for executing smoothing processing on the reduced image; and an image enlarging process for creating an enlarged image enlarged from the reduced image, subjected to the smoothing processing executed by the smoothing processing device, with an image enlargement ratio corresponding to a reciprocal of the image reduction ratio, and an image display code for displaying an image processed by the first filter process or the second filter process based on the selection thereof.

* * * * *